[![](]

United States Patent
Kon et al.

(10) Patent No.: US 12,362,942 B2
(45) Date of Patent: Jul. 15, 2025

(54) SYSTEMS AND METHODS FOR SECURE CLIENT-SERVER AUTHENTICATION WITH KEY RECYCLING

(71) Applicant: JPMORGAN CHASE BANK, N.A., New York, NY (US)

(72) Inventors: Wen Yu Kon, Singapore (SG); Kaushik Chakraborty, Singapore (SG); Lim Ci Wen, Singapore (SG); Omar Amer, New York, NY (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 126 days.

(21) Appl. No.: 18/348,865

(22) Filed: Jul. 7, 2023

(65) Prior Publication Data
US 2025/0150281 A1    May 8, 2025

(51) Int. Cl.
*H04L 9/32* (2006.01)
*H04L 9/08* (2006.01)

(52) U.S. Cl.
CPC .......... *H04L 9/3242* (2013.01); *H04L 9/0852* (2013.01); *H04L 9/0891* (2013.01)

(58) Field of Classification Search
CPC .... H04L 9/3242; H04L 9/0852; H04L 9/0891
USPC ....................................................... 713/171
See application file for complete search history.

(56) References Cited

U.S. PATENT DOCUMENTS

| | | | |
|---|---|---|---|
| 8,639,932 B2* | 1/2014 | Wiseman | H04L 9/0855 713/171 |
| 10,756,889 B2* | 8/2020 | Han | H04L 9/0852 |
| 11,095,634 B2* | 8/2021 | Peddada | H04L 9/3255 |
| 2011/0271110 A1* | 11/2011 | Ohba | H04W 12/0433 713/168 |
| 2017/0338952 A1* | 11/2017 | Hong | H04L 9/083 |
| 2019/0394031 A1* | 12/2019 | Deng | H04L 9/0852 |
| 2021/0328801 A1* | 10/2021 | Sly | G06V 40/168 |

* cited by examiner

*Primary Examiner* — Dereena T Cattungal
(74) *Attorney, Agent, or Firm* — GREENBERG TRAURIG LLP

(57) ABSTRACT

A method may include: sharing, by a client computer program and a server computer program, a set of identification keys, each identification key associated with a key label, and an authentication key; selecting, by the client computer program and the server computer program, one of the key labels; preparing, by the client computer program, quantum systems using a basis, randomly chosen bit values, and intensities; sending, by the client computer program, the quantum systems to the server computer program over a quantum communication channel, wherein the server computer program may be configured to measure the quantum systems using the basis and to announce quantum systems with photon detection; and generating, by the client computer program, a client tag using a shared keyed hash function executed on the authentication key and chosen bit values from the quantum systems with photon detection, and forwarding the client tag to the server computer program.

19 Claims, 7 Drawing Sheets

SYSTEMS AND METHODS FOR SECURE CLIENT-SERVER AUTHENTICATION WITH KEY RECYCLING

BACKGROUND OF THE INVENTION

1. Field of the Invention

Embodiments relate to systems and methods for secure client-server authentication with key recycling.

2. Description of the Related Art

Client/Server authentication is one of the most important cryptography primitives that is used as a building block of constructing a plethora of real-world applications. It allows for two parties to authenticate each other's identity.

It is well-known that with the help of simple quantum communication, one can design a secure client authentication protocol. The performance and security of all the existing secure client authentication protocols, however, suffer from some serious practical issues, such as loss tolerance (i.e., an unavoidable phenomena in any long-distance quantum communication protocol, and can severely affect the performance of any protocol. In existing protocols, due to the photon loss, the legitimate clients always fail to pass the authenticity test.), client-server authentication (e.g., in most applications, both the server and the client need to authenticate each other. Existing protocols only provide an one-sided authentication, i.e., either server or client authentication.), and security against multi-photon events (e.g., the security of existing protocols relies on the availability of a perfect single-photon source. The use of any imperfect single-photon source can compromise the security of such protocols.).

SUMMARY OF THE INVENTION

Systems and methods for secure client-server authentication with key recycling are disclosed. In one embodiment, a method for secure client authentication may include: (1) sharing, by a client computer program for a client and a server computer program, a set of identification keys, each identification key associated with a key label, and an authentication key; (2) selecting, by the client computer program and the server computer program, one of the key labels; (3) preparing, by the client computer program, quantum systems using a basis, randomly chosen bit values, and intensities; (4) sending, by the client computer program, the quantum systems to the server computer program over a quantum communication channel, wherein the server computer program may be configured to measure the quantum systems using the basis and to announce quantum systems with photon detection; and (5) generating, by the client computer program, a client tag using a shared keyed hash function executed on the authentication key and chosen bit values from the quantum systems with photon detection, and forwarding the client tag to the server computer program.

In one embodiment, the server computer program may be configured to generate a client validation tag using the shared keyed hash function executed on the authentication key and measurement outcomes for the chosen bit values, to validate the client by comparing the client tag to the client validation tag, wherein the client is validated in response to the client tag matching the client validation tag.

In one embodiment, the basis may be generated using a key expansion algorithm.

In one embodiment, the method may also include: sharing, by the client computer program and the server computer program a privacy amplification seed; and performing, by the client computer program with the server computer program, privacy amplification to update the identification key associated with the key label.

In one embodiment, the method may also include selecting, by the client computer program with the server computer program, a new identification key in response to a failure.

In one embodiment, the measurement outcomes for the chosen bit values are corrected using error correction.

In one embodiment, the method may also include sending, by the client computer program a syndrome, wherein the client computer program performs the error correction using the syndrome and a tolerated error rate.

In one embodiment, the method may also include estimating, by the client computer program, a number of multi-photon events in the quantum systems with photon detection based on the announcement of the quantum systems with photon detection and an intensity for each of the quantum systems. The client computer program declares failure in response to the number of multi-photon events in the quantum systems with photon detection being above a threshold. The client computer program may also select the intensity for each of the quantum systems using a random number generator.

According to another embodiment, a method for secure client authentication may include: (1) sharing, by a server computer program and a client computer program for a client, a set of identification keys, each identification key associated with a key label, and an authentication key; (2) selecting, by the server computer program and the client computer program, one of the key labels; (3) receiving, by the server computer program and from the client computer program, quantum systems using a basis, randomly chosen bit values, and intensities over a quantum communication channel; (4) measuring, by the server computer program, the quantum systems using the basis; (5) determining, by the server computer program, quantum systems with photon detection; (6) announcing, by the server computer program, the quantum systems with photon detection to the client computer program; (7) receiving, by the server computer program and from the client computer program, a client tag generated using a shared keyed hash function executed on the authentication key and chosen bit values from the quantum systems with photon detection; (8) generating, by the server computer program, a client validation tag using the shared keyed hash function executed on the authentication key and measurement outcomes for the chosen bit values; and (9) validating, by the server computer program, the client by comparing the client tag to the client validation tag, wherein the client may be validated in response to the client tag matching the client validation tag.

In one embodiment, the basis may be generated using a key expansion algorithm.

In one embodiment, the method may also include: sharing, by the client computer program and the server computer program a privacy amplification seed; and performing, by the server computer program with the client computer program, privacy amplification to update the identification key associated with the key label.

In one embodiment, the method may also include selecting, by the server computer program with the client computer program, a new identification key in response to a failure.

In one embodiment, the method may also include: receiving, by the server computer program, a syndrome based on a tolerated error rate; and performing, by the server computer program, error correction on the measurement outcomes for the chosen bit values using the syndrome.

According to another embodiment, a method for secure client-server authentication may include: (1) sharing, by a server computer program and a client computer program for a client, a set of identification keys, each identification key associated with a key label, and an authentication key; (2) selecting, by the server computer program and the client computer program, one of the key labels; (3) receiving, by the server computer program and from the client computer program, quantum systems using a basis, randomly chosen bit values, and intensities over a quantum communication channel; (4) measuring, by the server computer program, the quantum systems using the basis; (5) determining, by the server computer program, quantum systems with photon detection; (6) announcing, by the server computer program, the quantum systems with photon detection to the client computer program; (7) splitting, by the server computer program, the quantum systems with photon detection into a first set and a second set; (8) receiving, by the server computer program and from the client computer program, a client tag generated using a shared keyed hash function executed on the authentication key and chosen bit values from the first set quantum systems with photon detection; (9) generating, by the server computer program, a client validation tag using the shared keyed hash function executed on the authentication key and measurement outcomes for the chosen bit values from the first set quantum systems with photon detection; (10) validating, by the server computer program, the client by comparing the client tag to the client validation tag, wherein the client is validated in response to the client tag matching the client validation tag; and (11) generating, by the server computer program, a server tag based on the second set of quantum systems with photon detection using the shared keyed hash function executed on the authentication key and measurement values for the chosen bit values from the second set of quantum systems with photon detection and forwarding the server tag to the client computer program, wherein the client computer program may be configured to generate a server validation tag using the shared keyed hash function executed on the authentication key and the chosen bit values in the second set of quantum systems with photon detection by comparing the server tag to the server validation tag, wherein the server is validated in response to the server tag matching the server validation tag.

In one embodiment, the method may also include sending, by the server computer program, a syndrome for the second set of quantum systems with photon detection to the server computer program, wherein the client computer program may be configured to correct the chosen bit values.

In one embodiment, the basis may be generated using a key expansion algorithm.

In one embodiment, the method may also include: sharing, by the client computer program and the server computer program a privacy amplification seed; and performing, by the server computer program with the client computer program, privacy amplification to update the identification key associated with the key label.

In one embodiment, the method may also include selecting, by the server computer program with the client computer program, a new identification key in response to a failure.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for secure client-server authentication with key recycling.

In embodiments, a valid client wants to access the service provided by the server, and the server wants to validate the client's identity, in order to ensure that appropriate service is provided to the valid client. At the end of the protocol, a valid client should be able to access the service while an invalid client is rejected. The passwords used, other than possibly the identification key, should also remain private from any attackers.

The main security concerns include: robustness (e.g., when the client is a valid client, a honest server should not reject the client); malicious client (e.g., an invalid client should not be able to be validated by the server); malicious servers (e.g., a malicious server without knowledge of the password should not be able to gain information that can allow it to be validated by an honest server at a later time, such as by learning the password or keeping the information and forwarding it to the server); and man-in-the middle attacks (e.g., a malicious man-in-the-middle without knowledge of the passwords should not be able to learn of the password, other than the identification key).

Figure 1:
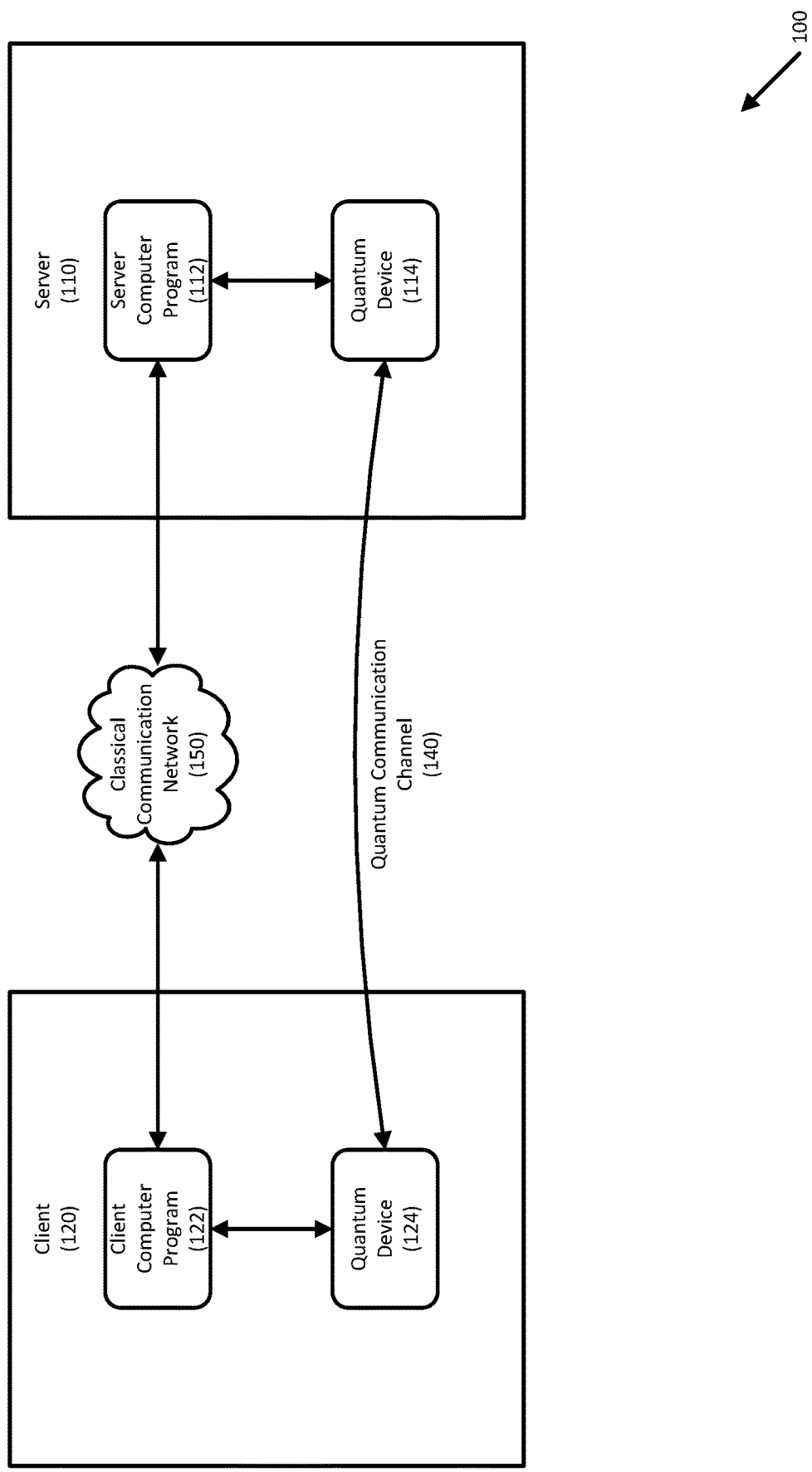
FIG. 1 illustrates a system for secure client-server authentication with key recycling according to an embodiment.

Referring to FIG. 1, a system for secure client-server authentication with key recycling is disclosed according to an embodiment. System 100 may include server 110 and client 120. Server 110 may be any suitable server, including physical and/or cloud-based server. Server 110 may execute server computer program 112 and may include quantum device 114.

Client 120 may be any suitable electronic device, including computers (e.g., workstations, desktops, laptops, notebooks, laptops, tablets, etc.), smart devices (e.g., smart phones, smart watches, etc.), Internet of Things (IoT) devices, etc. Client 120 may execute client computer program 122 and quantum device 124.

Examples of quantum devices 114 and 124 may include a laser source with a modulator (e.g., for client 120), and a photodetector with beam splitters (e.g., for server 110). Other types of devices may be used as is necessary and/or desired. Quantum devices 114 and 124 may communicate quantum information with each other using quantum communication channel 140, such as a direct optical fiber link. The quantum data may be communicated as photons.

Server computer program 112 and client computer program 122 may communicate with each other over classical communication network 150, which may include classical communication channels, such as optical fiber links, ethernet, the Internet, etc. Server computer program 112 and client computer program 122 may execute protocols for secure client authentication and secure client-server authentication.

Figure 2A:
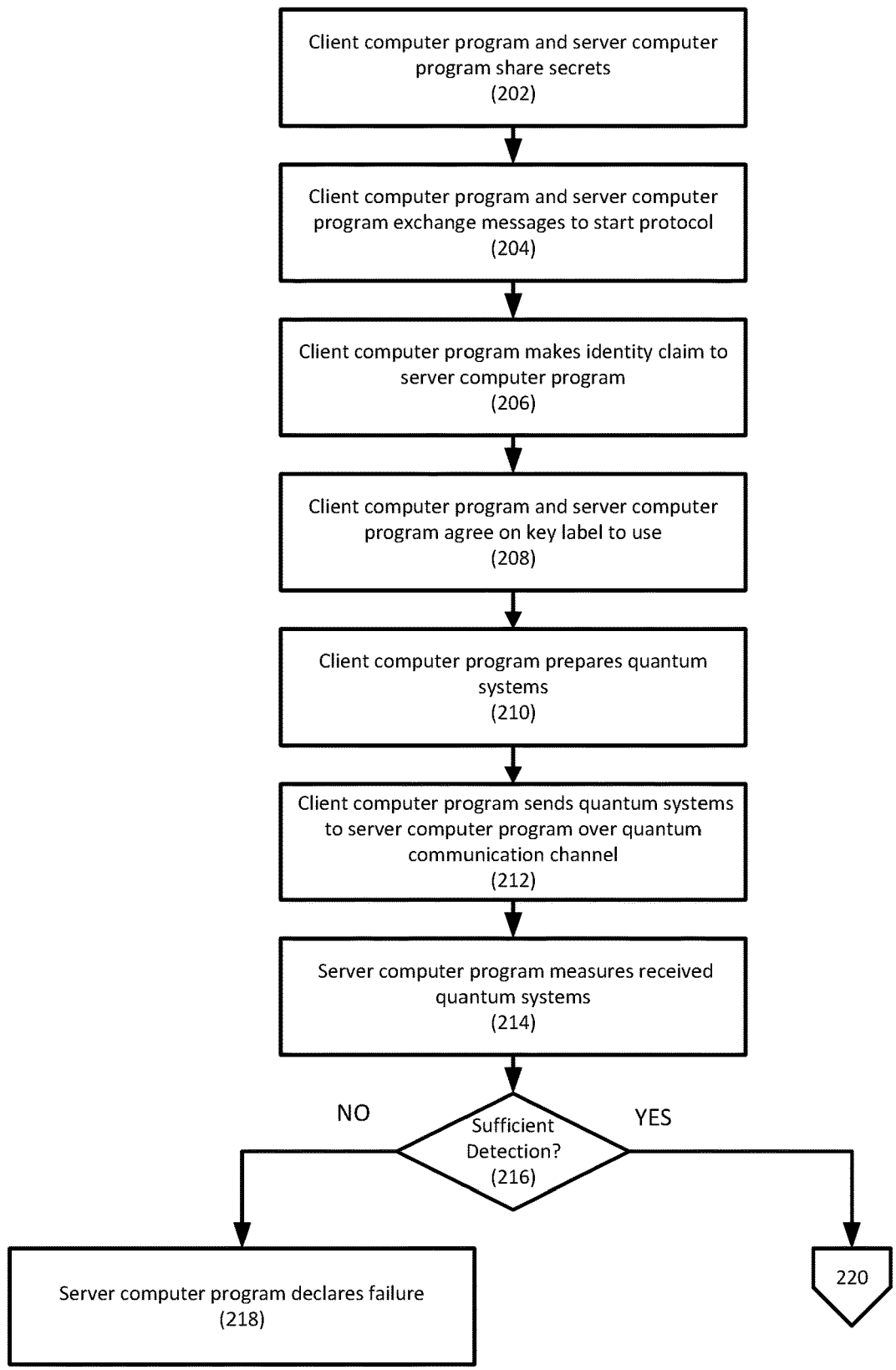
FIGS. 2A and 2B illustrate a method for secure client authentication according to an embodiment.
Figure 2B:
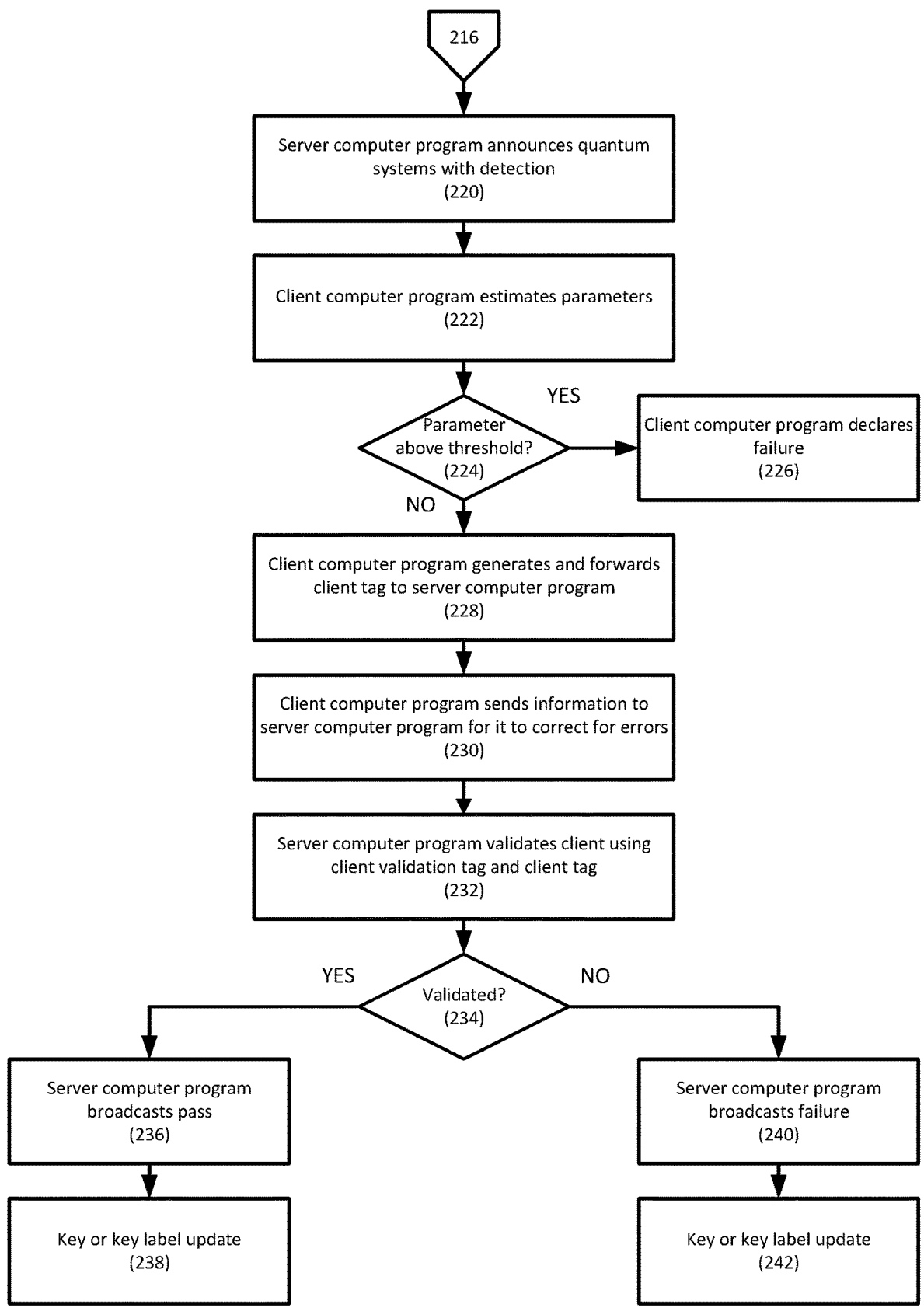

Referring to FIGS. 2A and 2B, a method for secure client authentication is disclosed according to an embodiment.

In step 202, a client computer program and a server computer program may share secrets. For example, the client computer program and the client may share three secrets: a set of identification keys θ, an authentication key K, and a privacy amplification seed r. Identification keys θ may include a set of m secrets $\{\theta^1, \theta^2, \ldots, \theta^m\}$ for any i=1, 2, ..., m. The length of each identification key $\theta^i$ may be small compared to the length of authentication key K.

Each identification key $\theta^i$ may be d-bit random string, i.e., $\theta^i \in \{0, 1\}^d$.

The authentication key K may have four components, e.g., $w_1$, $w_2$, $w_3$, and $w_4$. $w_1$ and $w_3$ may be seeds to a quantum-proof strong extractor EXT, which may be a family of functions. For example, EXT may be a family of two universal hash functions. $w_2$ and $w_4$ may be l-bit random strings, i.e., $w_2, w_4 \in \{0, 1\}^l$. Components $w_2$ and $w_4$ may have any values from 0 to $2^l-1$.

Privacy amplification seed r may be a member of a set of random numbers, R, and may be used for key recycling. Privacy amplification seed may be a random seed to the function $EXT_2$, similar to components $w_1$ and $w_3$.

In one embodiment, the client computer program and the server computer program may be pre-shared with K, θ, and r.

The function $EXT_2$ may be similar to the function EXT described above.

The client and server may hold key labels γ and γ' respectively, which are used to keep track of the identification key $\theta^\gamma$ to use for basis choice in each iteration of the protocol. Key labels γ and γ' may be public information.

As used herein, "round" refers to the preparing, sending and measurement of one quantum system. For example, embodiments may prepare, send, and measure n quantum systems $Q_1$ to $Q_n$, so there are a total of n quantum systems, or "rounds." The quantum systems may be tracked by their index i.

A "quantum system" refers to the physical carriers of quantum information. Examples of physical carriers include photons that are sent between quantum devices.

The client and server may also share a keyed hash function H(a∥b, x):=EXT(a, x)+b (where the key is (a, b)∈{($w_1,w_2$), ($w_3,w_4$)}) to generate an l-bit tag for authentication, and a second quantum-proof strong extractor $EXT_2$ (r, x') with seed r, which maps an L-bit input x' to a d-bit output to update the identification key at the end of each iteration of the protocol.

In step 204, the client computer program and the server computer program may exchange messages to start the protocol. For example, the client computer program may send a hello message to the server to begin the secure identification protocol, and the server computer program may respond with a hello message to indicate that it is ready to begin the protocol.

Any suitable messaging process to initiate the protocol may be used as is necessary and/or desired.

In step 206, the client computer program may make an identity claim to the server computer program. The client announces its identity and provides the key label γ.

In step 208, the client computer program and server computer program may agree on a key label to use. For example, the client computer program may announce key label γ, and the sever computer program may announce γ', and both the client computer program and the server computer program may select the key label j=max[γ, γ']. The client computer program and server computer program may also update their key labels γ=j and γ'=j, noting that the identification keys $\theta^i$ for i<j have been compromised based on the other party's records.

In step 210, the client computer program may prepare quantum systems. For example, the client computer program may generate n quantum systems using the information from the basis generated from the identification key $\theta^\gamma$ (using the agreed-upon key label γ), the randomly chosen bit values x, and intensities.

In one embodiment, the randomly-chosen bit values may be generated by the client computer program using a random number generator or similar.

In one embodiment, the client computer program may select the intensities using a random number generator before it prepares the quantum systems. For example, the client computer program may randomly choose these intensities from a set of three or more possible intensities.

The client computer program may optionally use a key expansion algorithm to create a longer bit string of size n from the d-bit identification key $\theta^\gamma$. For example, the key expansion algorithm, such as AES, may be take a short random string, such as $\theta^\gamma$, and may expand it to a longer bit string, such as $\tilde{\theta}$. The longer bit string $\tilde{\theta}$, may be the basis by the client computer system.

The key expansion algorithm may be used if the identification key that was shared is short, but the parties requires a longer bit string for the basis (e.g., due to memory constraints).

In one embodiment, the client computer program may generate a random n-bit string x, select three intensity values $\mu_1, \mu_2, \mu_3$, and generate a n-ternary digit ("trit") string v. The client computer program may instruct the quantum device to generate n quantum systems, $Q_1, \ldots, Q_n$. Each quantum system may be prepared in a phase-randomized coherent state (e.g., following a quantum key distribution scheme, such as BB84) with basis $\tilde{\theta}$, bit value x, and intensity $\mu_v$.

In step 212, the client computer program may send the quantum states to the server computer program over a quantum communication channel. For example, the client computer program may send the n quantum systems $Q_1, \ldots, Q_n$ to the server computer program. Due to the channel loss, some of the quantum systems will be lost.

In step 214, the server computer program may measure the received quantum systems. The measurement may detect the presence of photons in the quantum systems, and may also give information on the state of the photons depending on the basis. In one embodiment, the server computer program may use the same key expansion algorithm to create a longer bit string $\tilde{\theta}$ of size n from the d-bit identification key $\theta^\gamma$. Then, in each round, the server computer program may measure quantum system $Q_i$ using $i^{th}$ bit of the longer bit string $\tilde{\theta}_i$, and may record outcome $x'_i$ based on the detection. If the server computer program detects no photons, it may declare the round to have a no photon detection event and may set $x'_i$ to a value other than 0 or 1. If the server computer program detects other inconclusive outcomes, it may randomly select $x'_i \in \{0, 1\}$. The server computer program may record the set S to contain the indices of quantum systems where there is a detection, i.e., quantum systems that are not declared as a no photon detection event.

In step 216, if there are sufficiently many quantum systems where there is a detection (i.e., there are sufficiently many quantum systems in set S) the server computer program may set $D_{det}=1$, and in step 220, the server computer program may announce quantum systems with detection, i.e., the set S.

If there are an insufficient number of quantum systems with detection, e.g., if $|S|<S_{th}$ for some threshold $S_{th}$, then the server computer program may set $D_{det}=0$, and in step 218, the server computer program may declare a failure.

In step 222, the client computer program may estimate parameters. Based on the detection announcement and choice of intensity, the client computer program may estimate the number of multi-photon events in the detected quantum systems. If, in step 224, the estimated number exceeds a certain threshold, the parameter estimation fails, and in step 226, the client computer program may broadcast a failure decision.

For example, the client computer program may compute an estimate of the multi-photon events in these sets, based on the number of detected quantum systems in set S for each given intensity choice. If the estimated number of multi-photon events exceeds a tolerance value, in step 226, the client computer program may declare that the protocol has failed, and may set $D_{PE}=0$. Otherwise, the client computer program may set $D_{PE}=1$.

In step 228, the client computer program may generate and forward a client tag to server computer program. In one embodiment, the client computer program may generate the client tag based on the authentication key K and chosen bit values x of the detected quantum systems. The client computer program may use the shared keyed hash function H to generate the client tag. For example, the client computer program may generate client tag $t_{CV}=H(w_1\|w_2, x_S\|0^{n-|S|})$ and may forward the client tag to the server computer program.

In step 230, to avoid the impact of the channel noise, the client computer program and the server computer program may perform classical error correction. For example, the client may provide information for the server to correct its measurement outcomes x' to match the chosen bit values x of the detected quantum systems.

In one embodiment, the client computer program may generate a syndrome $P_C(x_S, e_{tol})$, based on the tolerated error rate $e_{tol}$ and may send this syndrome to the server computer program. The server computer program may use the syndrome to correct its measurement outcomes, $\hat{x}_S=f_P(P_C, x'_S)$.

In step 232, the server computer program may validate the client. The server computer program may generate a client validation tag using the authentication key K and the corrected measurement outcome of the detected quantum systems. If, in step 234, the client validation tag matches the client tag, in step 236, the client validation passed. If it does not, in step 240, the server computer program may broadcast failure.

For example, the server computer program may compute client validation tag $\tilde{t}_{CV}=H(w_1\|w_2, \hat{x}_S\|0^{n-|S|})$ and may check to see if client tag $t_{CV}$=client validation tag $\tilde{t}_{CV}$. If the tags match, the server computer program may validate the client and outputs $D_{CV}=1$. Otherwise, the server computer program may declare a failure, and may set $D_{CV}=0$.

In step 238, the server computer program and the client computer program may perform privacy amplification to update the identification key $\theta^\gamma$ using the second extractor $EXT_2$ with seed r, and having $\theta^\gamma$ and the chosen bit values/corrected measurement outcomes as inputs.

For example, if the protocol is declared as a success by the client, (i.e., $D_{PE}=1$), the client computer program may perform privacy amplification to update the identification key, $\theta^\gamma=EXT_2(r, \tilde{\theta}\|x_S\|0^{L-n-|S|})$. If the protocol is declared as a success by the server (i.e., $D_{det}=1$ and $D_{CV}=1$), the server computer program may perform privacy amplification to update its identification key, $\theta^{\prime\gamma}=EXT_2(r, \tilde{\theta}\|\hat{x}_S\|0^{L-n-|S|})$.

There is a small chance that the server's updated identification key $\theta^{\prime\gamma}$ may be mismatched with the client's updated identification key $\theta^\gamma$. In this case, the server may continue using its updated identification key $\theta^{\prime\gamma}$ in future iterations of the protocol.

In step 242, if the protocol is declared as a failure by the client computer program (i.e., $D_{PE}=0$), the client computer program may set $\gamma=\gamma+1$. If the protocol is declared as a failure by the server computer program, (i.e., $D_{det}=0$ or $D_{CV}=0$), the server computer program may set $\gamma'=\gamma'+1$. If $\gamma>m$ or $\gamma'>m$, the protocol aborts entirely and both the client computer program and the server computer program may refresh the set of identification keys $\theta$.

Figure 3A:
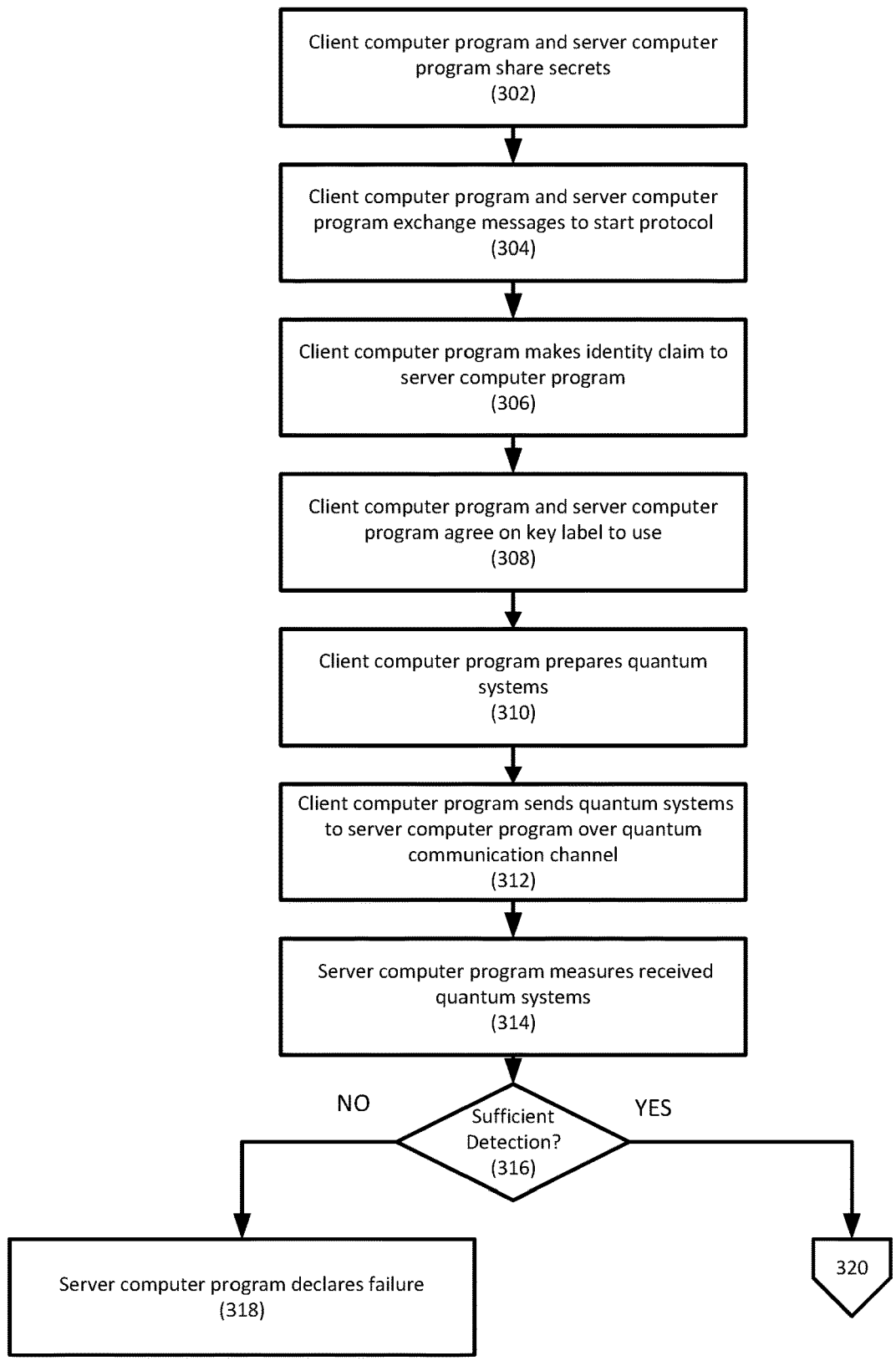
FIGS. 3A, 3B, and 3C illustrate a method for secure server-client authentication according to an embodiment.
Figure 3B:
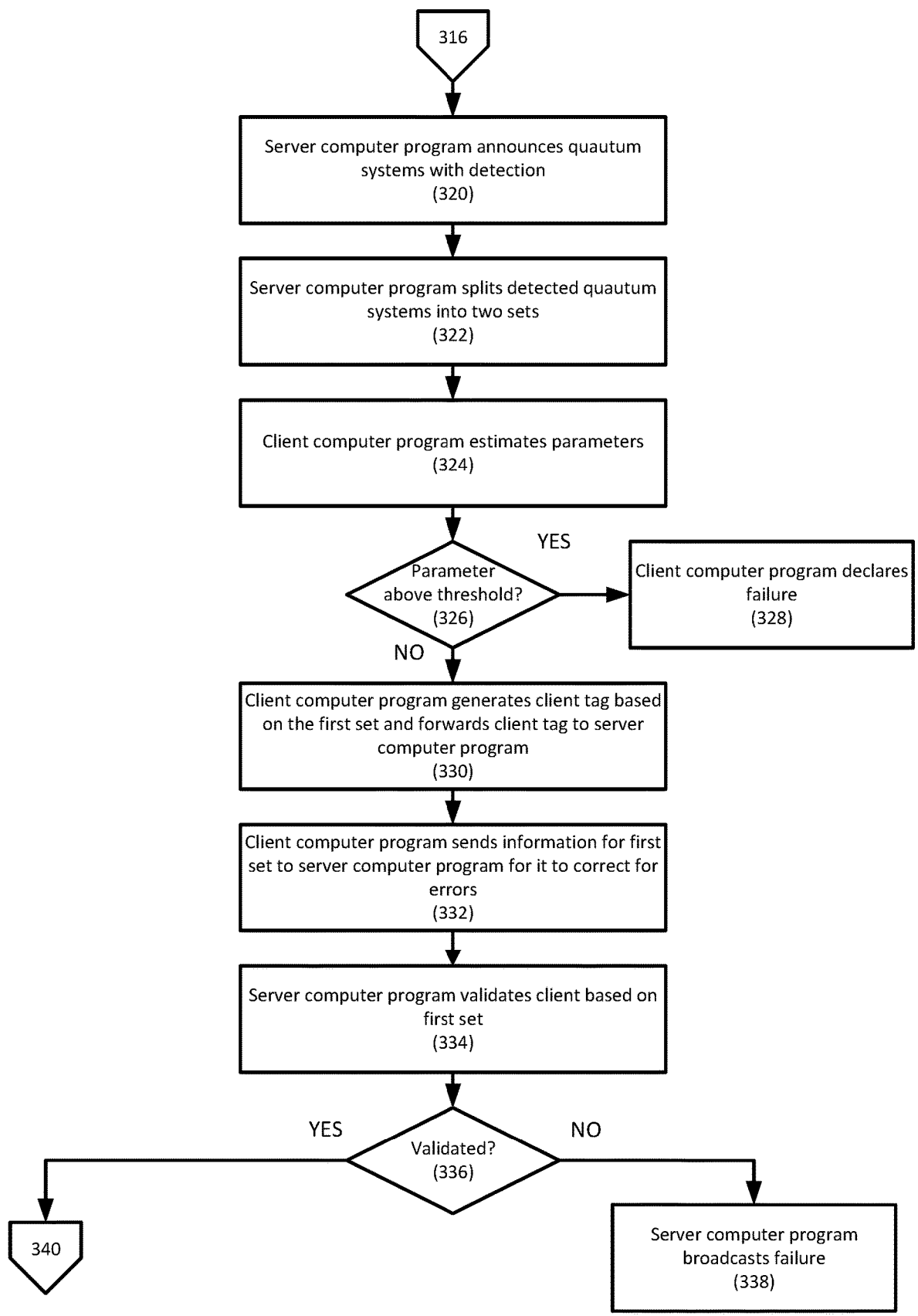
Figure 3C:
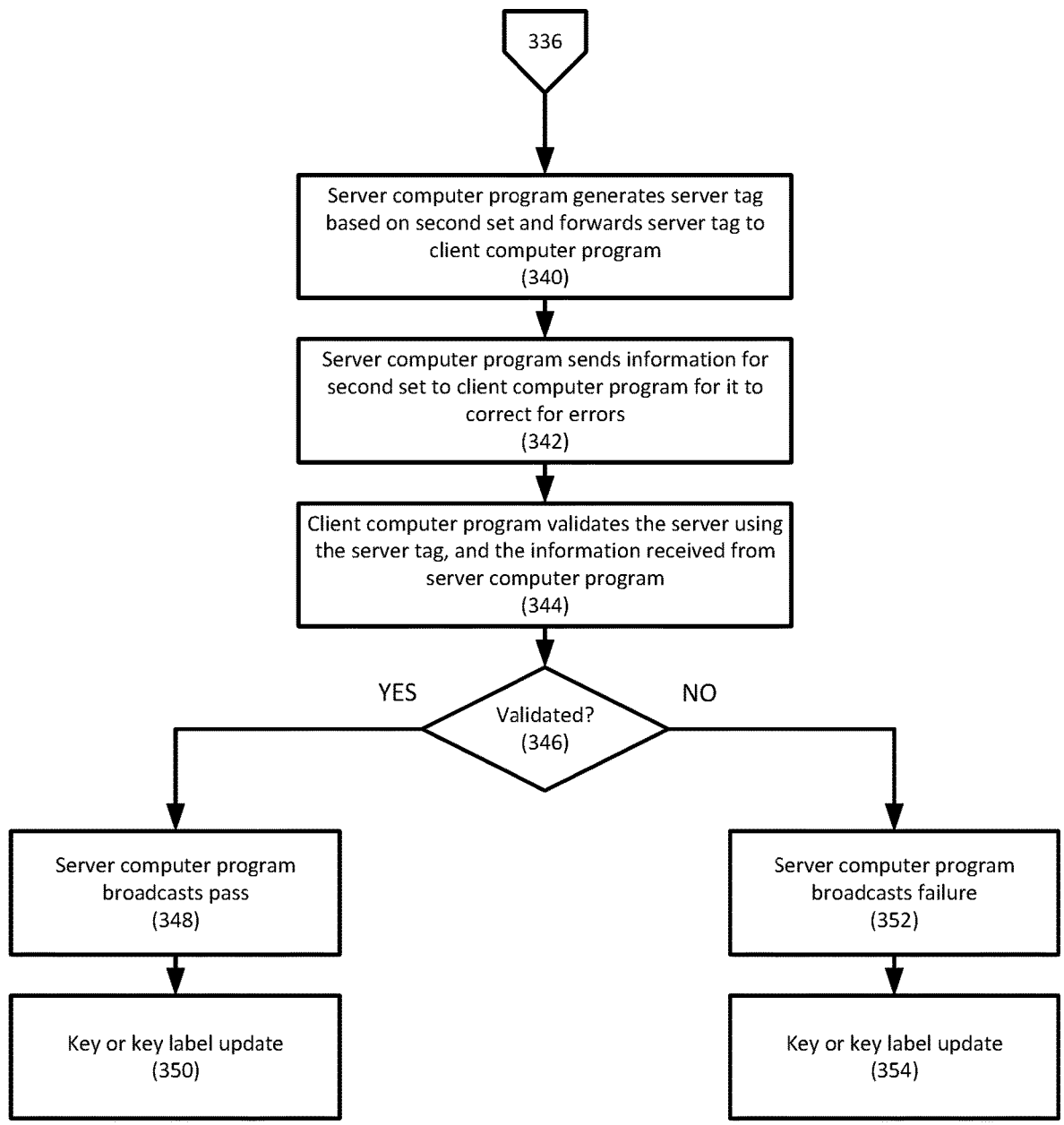

Referring to FIGS. 3A, 3B, and 3C, a method for secure server-client authentication is disclosed according to an embodiment.

Steps 302-320 may be similar to steps 202-220 described above.

In step 322, the server computer program may split the detected quantum systems into two sets. For example, the server computer program may announces a random split of the detected quantum systems into two sets, $S_1$ and $S_2$.

In step 324, the client computer program may estimate parameters. This may be similar to step 222, above.

If, in step 326, the estimated number exceeds a certain threshold, the parameter estimation fails, and in step 328, the client computer program may broadcast the failure decision. These steps may be similar to steps 224 and 226, respectively.

If the parameters are not above the threshold, in step 330, the client computer program may generate a client tag based on the first set ($S_1$) and may forward the client tag to the server computer program. In one embodiment, the client computer program may generate the client tag based on the authentication key K and chosen bit values x of the detected quantum systems in the first set. The client computer program may use the shared keyed hash function H to generate the client tag. For example, the client computer program may generate client tag $t_{CV}=H(w_1\|w_2, x_{S_1}\|0^{n-|S_1|})$ and may forward the client tag to the server computer program.

In step 332, to avoid the impact of the channel noise, the client computer program and the server computer program may perform classical error correction. For example, the client may provide information for the server to correct its measurement outcomes x' to match the chosen bit values x of the detected quantum systems.

In one embodiment, the client computer program may generate a syndrome $P_C(x_{S_1}, e_{tol})$, based on the tolerated error rate $e_{tol}$ and may send this syndrome to the server computer program. The server computer program may use the syndrome to correct its measurement outcomes, $\hat{x}_{S_1}=f_P(P_C, x'_{S_1})$.

In step 334, the server computer program may validate the client based on the first set. The server computer program may generate a client validation tag using the authentication key K and the corrected measurement outcome of the detected quantum systems for the first set. If, in step 336, the client validation tag matches the client tag, in step 340, the client validation passed. If it does not, in step 338, the server computer program may broadcast failure.

For example, the server computer program may compute client validation tag $\tilde{t}_{CV}=H(w_1\|w_2, \hat{x}_{S_1}\|0^{n-|S_1|})$ and may check to see if client validation tag $t_{CV}$=server tag $\tilde{t}_{CV}$. If the tags matches, the server computer program may validate the client and outputs $D_{CV}=1$. Otherwise, the server computer program may declare a failure, and may set $D_{CV}=0$.

In step 340, the server computer program may generate a server tag based on the second set and may forward the server tag to the client computer program. For example, the server computer program may generate server tag $t_{SV}=H(w_3\|w_4, x'_{S_2}\|0^{n-|S_2|})$ and may forward the server tag to the client computer program.

In step 342, the server computer program may send a syndrome/information for second set to the client computer program for it to correct for errors. For example, the server computer program may generate a syndrome $P_D(x'_{S_2}, e_{tol})$ and may send the syndrome to the client computer program. The client computer program may use the syndrome to correct the client computer program's chosen bit values, $\hat{x}'_{S_2}=f_P(P_D, x'_{S_2})$.

In step 344, the client computer program may validate the server using the server tag and the syndrome/information received from server computer program. For example, the client computer program may compute server validation tag $\tilde{t}_{SV}=H(w_3\|w_4, \hat{x}'_{S2}\|0^{n-|S_2|})$ and may check to see if server tag $t_{SV}=$server validation tag $\tilde{t}_{SV}$. If, in step 346, the tags match, in step 348, the server computer program may validate the client and outputs $D_{SV}=1$.

In step 350, the server computer program and the client computer program may perform privacy amplification to update the identification key $\theta^\gamma$ using the second extractor $EXT_2$ with seed r, and having $\theta^\gamma$ and the chosen bit values/corrected measurement outcomes as inputs.

For example, if the protocol is declared as a success by the client, (i.e., $D_{SV}=1$ and $D_{PE}=1$), the client computer program may perform privacy amplification to update the identification key $\theta^\gamma=EXT_2(r, \tilde{\theta}\|s_{S_1}\|\hat{x}'_{S_2}\|0^{L-n-|S|})$. If the protocol is declared as a success by the server (i.e., $D_{det}=1$ and $D_{CV}=1$), the server computer program may perform privacy amplification to update its identification $\theta^{\gamma'}=EXT_2(r, \tilde{\theta}\|\hat{x}_{S_1}\|x'_{S_2}\|0^{L-n-|S|})$.

If the server's updated identification key $\theta^{\gamma'}$ is mismatched with the client's updated identification key $\theta^\gamma$, the server would continue using its updated identification key $\theta^{\gamma'}$ in future iterations of the protocol.

In step 352, if the protocol is declared as a failure, the server computer program may broadcast a failure.

In step 354, the protocol is declared as a failure by the client computer program (i.e., $D_{SV}=0$ or $D_{PE}=0$), the client computer program may set $\gamma=\gamma+1$. If the protocol is declared as a failure by the server computer program, (i.e., $D_{det}=0$ or $D_{CV}=0$), the server computer program may set $\gamma'=\gamma'+1$. If $\gamma>m$ or $\gamma'>m$, the protocol may abort entirely and both the client computer program and the server computer program may refresh the set of identification keys.

Figure 4:
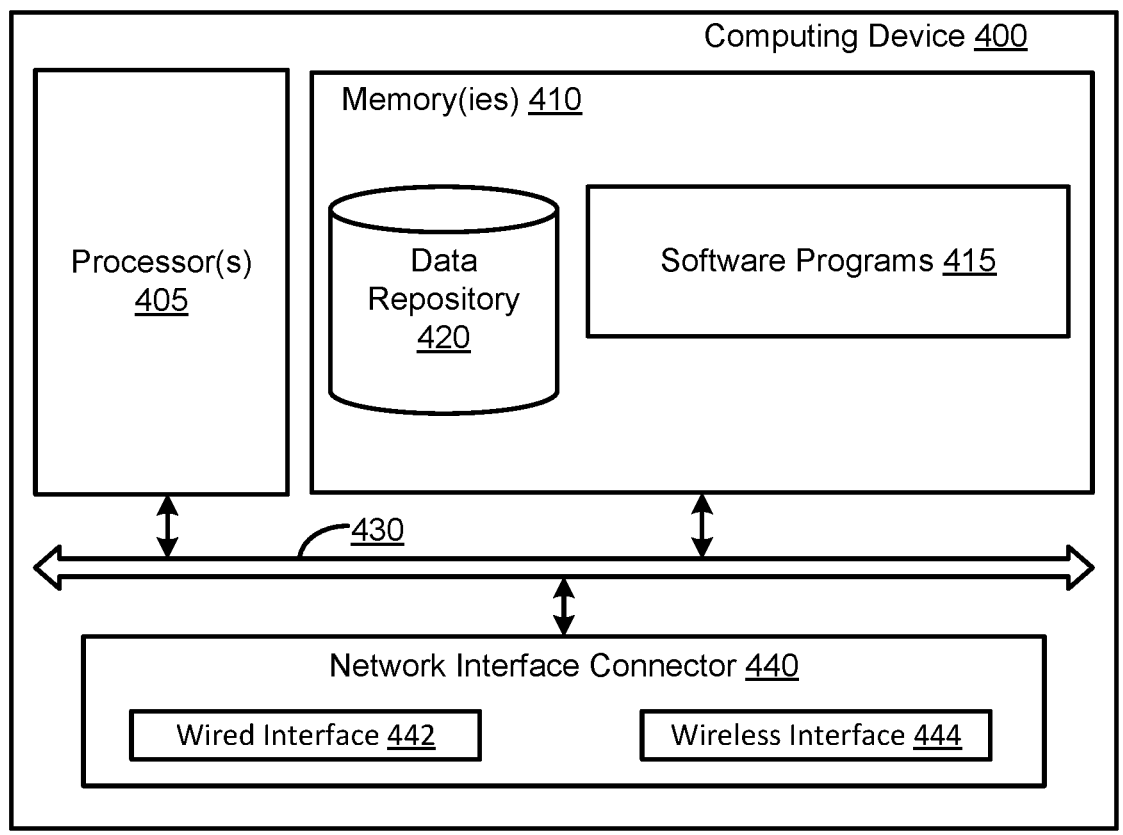
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for secure client authentication, comprising:
    sharing, by a client computer program for a client and a server computer program, a set of identification keys, each identification key associated with a key label, and an authentication key;
    selecting, by the client computer program and the server computer program, one of the key labels;
    preparing, by the client computer program, quantum systems using a basis, randomly chosen bit values, and intensities;
    sending, by the client computer program, the quantum systems to the server computer program over a quantum communication channel, wherein the server computer program is configured to measure the quantum systems using the basis and to announce quantum systems with photon detection; and
    generating, by the client computer program, a client tag using a shared keyed hash function executed on the authentication key and chosen bit values from the quantum systems with photon detection, and forwarding the client tag to the server computer program;
    wherein the server computer program is configured to generate a client validation tag using the shared keyed hash function executed on the authentication key and measurement outcomes for the chosen bit values, to validate the client by comparing the client tag to the client validation tag, wherein the client is validated in response to the client tag matching the client validation tag.

2. The method of claim 1, wherein the basis is generated using a key expansion algorithm.

3. The method of claim 1, further comprising:
    sharing, by the client computer program and the server computer program a privacy amplification seed; and
    performing, by the client computer program with the server computer program, privacy amplification to update the identification key associated with the key label.

4. The method of claim 3, further comprising:
    selecting, by the client computer program with the server computer program, a new identification key in response to a failure.

5. The method of claim 1, wherein the measurement outcomes for the chosen bit values are corrected using error correction.

6. The method of claim 5, further comprising:
    sending, by the client computer program a syndrome, wherein the client computer program performs the error correction using the syndrome and a tolerated error rate.

7. The method of claim 1, further comprising:
    estimating, by the client computer program, a number of multi-photon events in the quantum systems with photon detection based on the announcement of the quantum systems with photon detection and an intensity for each of the quantum systems.

8. The method of claim 7, wherein the client computer program declares failure in response to the number of multi-photon events in the quantum systems with photon detection being above a threshold.

9. The method of claim 7, wherein the client computer program selects the intensity using a random number generator.

10. A method for secure client authentication, comprising:
    sharing, by a server computer program and a client computer program for a client, a set of identification keys, each identification key associated with a key label, and an authentication key;
    selecting, by the server computer program and the client computer program, one of the key labels;
    receiving, by the server computer program and from the client computer program, quantum systems using a basis, randomly chosen bit values, and intensities over a quantum communication channel;
    measuring, by the server computer program, the quantum systems using the basis;
    determining, by the server computer program, quantum systems with photon detection;
    announcing, by the server computer program, the quantum systems with photon detection to the client computer program;
    receiving, by the server computer program and from the client computer program, a client tag generated using a shared keyed hash function executed on the authentication key and chosen bit values from the quantum systems with photon detection;
    generating, by the server computer program, a client validation tag using the shared keyed hash function executed on the authentication key and measurement outcomes for the chosen bit values; and
    validating, by the server computer program, the client by comparing the client tag to the client validation tag, wherein the client is validated in response to the client tag matching the client validation tag.

11. The method of claim 10, wherein the basis is generated using a key expansion algorithm.

12. The method of claim 10, further comprising:
    sharing, by the client computer program and the server computer program a privacy amplification seed; and
    performing, by the server computer program with the client computer program, privacy amplification to update the identification key associated with the key label.

13. The method of claim 12, further comprising:
    selecting, by the server computer program with the client computer program, a new identification key in response to a failure.

14. The method of claim 10, further comprising:
    receiving, by the server computer program, a syndrome based on a tolerated error rate; and
    performing, by the server computer program, error correction on the measurement outcomes for the chosen bit values using the syndrome.

15. A method for secure client-server authentication, comprising:
    sharing, by a server computer program and a client computer program for a client, a set of identification keys, each identification key associated with a key label, and an authentication key;
    selecting, by the server computer program and the client computer program, one of the key labels;

receiving, by the server computer program and from the client computer program, quantum systems using a basis, randomly chosen bit values, and intensities over a quantum communication channel;

measuring, by the server computer program, the quantum systems using the basis;

determining by the server computer program, quantum systems with photon detection;

announcing, by the server computer program, the quantum systems with photon detection to the client computer program;

splitting, by the server computer program, the quantum systems with photon detection into a first set and a second set;

receiving, by the server computer program and from the client computer program, a client tag generated using a shared keyed hash function executed on the authentication key and chosen bit values from the first set quantum systems with photon detection;

generating, by the server computer program, a client validation tag using the shared keyed hash function executed on the authentication key and measurement outcomes for the chosen bit values from the first set quantum systems with photon detection;

validating, by the server computer program, the client by comparing the client tag to the client validation tag, wherein the client is validated in response to the client tag matching the client validation tag; and generating, by the server computer program, a server tag based on the second set of quantum systems with photon detection using the shared keyed hash function executed on the authentication key and measurement values for the chosen bit values from the second set of quantum systems with photon detection and forwarding the server tag to the client computer program, wherein the client computer program is configured to generate a server validation tag using the shared keyed hash function executed on the authentication key and the chosen bit values in the second set of quantum systems with photon detection by comparing the server tag to the server validation tag, wherein the server is validated in response to the server tag matching the server validation tag.

16. The method of claim 15, further comprising:
sending, by the server computer program, a syndrome for the second set of quantum systems with photon detection to the server computer program, wherein the client computer program is configured to correct the chosen bit values.

17. The method of claim 15, wherein the basis is generated using a key expansion algorithm.

18. The method of claim 15, further comprising:
sharing, by the client computer program and the server computer program a privacy amplification seed; and
performing, by the server computer program with the client computer program, privacy amplification to update the identification key associated with the key label.

19. The method of claim 18, further comprising:
selecting, by the server computer program with the client computer program, a new identification key in response to a failure.

* * * * *